(No Model.)

A. J. BRANHAM.
VELOCIPEDE.

No. 283,697. Patented Aug. 21, 1883.

Witnesses:
John T Morrow
E. H. Bates

Inventor:
A. J. Branham
by Anderson Smith
his Attorneys.

UNITED STATES PATENT OFFICE.

ALVIN JAMES BRANHAM, OF HOUSTONIA, MISSOURI.

VELOCIPEDE.

SPECIFICATION forming part of Letters Patent No. 283,697, dated August 21, 1883.

Application filed June 11, 1883. (No model.)

*To all whom it may concern:*

Be it known that I, ALVIN J. BRANHAM, a citizen of the United States, residing at Houstonia, in the county of Pettis and State of Missouri, have invented certain new and useful Improvements in Velocipedes; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
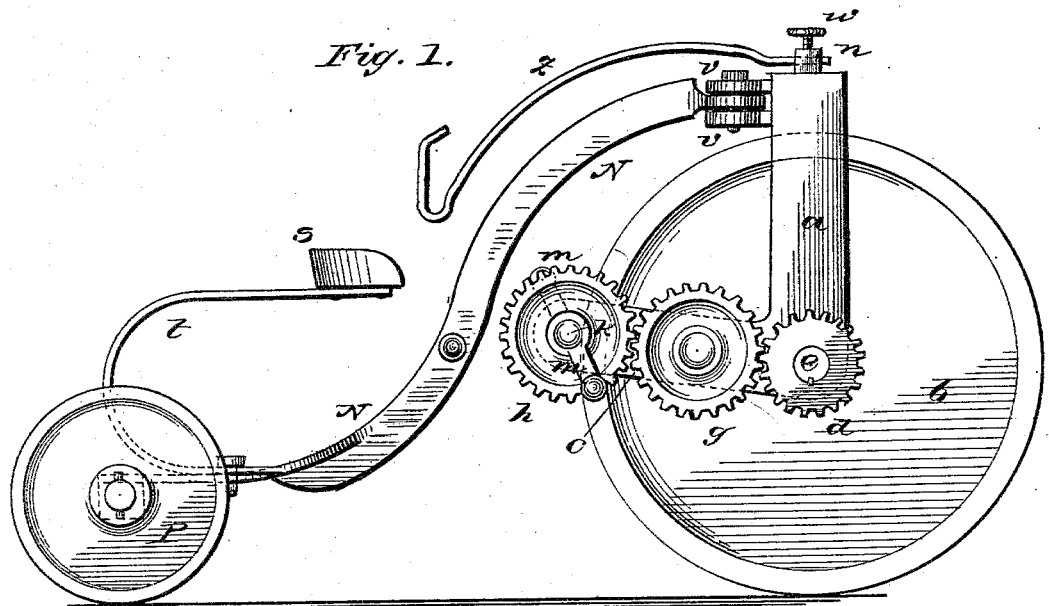
Figure 2:
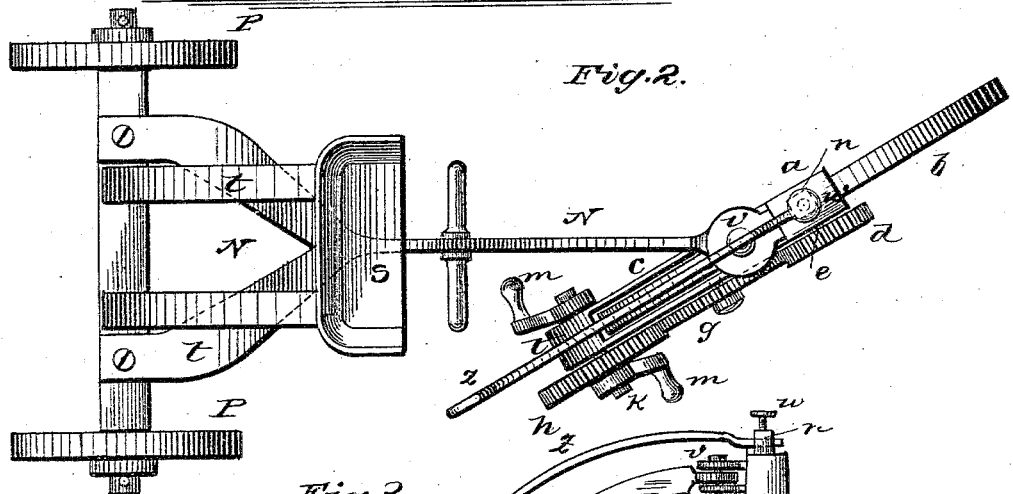
Figure 3:
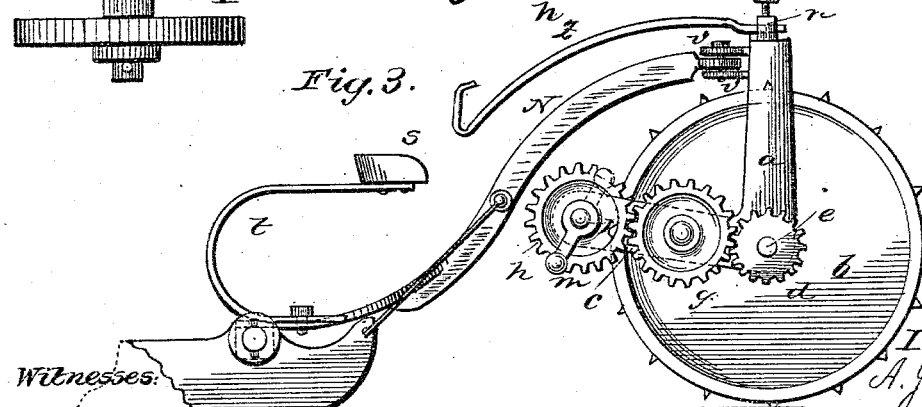

Figure 1 of the drawings is a side view. Fig. 2 is a top view, and Fig. 3 is also a side view.

This invention has relation to velocipedes; and it consists in the construction and novel arrangement of devices, as hereinafter set forth, and particularly pointed out in the appended claim.

In the accompanying drawings, the letter $a$ designates the forked upright in front, to which the driving-wheel $b$ is pivoted, said forked upright having a rear arm, $c$, which extends back of the rear edge of the wheel $b$. The wheel-shaft $e$ passes through bearings at the lower ends of the branches of the forked upright, and carries a toothed wheel, $d$, which is rigidly attached thereto. A series of toothed wheels, $g$ $h$, carried by the rear extension, $c$, engaging each other, are geared in connection with the toothed shaft-wheel $d$. The last wheel of the series is provided with a shaft, $k$, which is seated in a strong bearing, $l$, at the rear end of the extension $c$, and is provided with crank handles or treadles, as indicated at $m$.

N represents a curved or bent tongue or bar, to the rear end of which is connected a transverse shaft or axle, carrying the rear wheels, P. The rear end of the tongue may be formed with lateral oblique branches, to be footed to the axle.

S represents the seat, which is usually supported upon springs $t$ in a position in rear of the handles or treadles $m$, and sufficiently raised to enable a person seated thereon to operate said handles or treadles conveniently. The front end of the tongue or reach-bar N is made in disk form, horizontally broad and circular, and is pivoted between broad horizontal lugs or bearings $v$, extending rearwardly from the upper portion of the upright $a$, to which the drive-wheel is pivoted.

To the upper end of the forked upright $a$ is secured a lever-arm, $z$, which extends backward and sufficiently to be within easy reach of the operator.

The lever-arm $z$ may be made adjustable in a bearing, $n$, a set-screw, $w$, being provided for fastening it rigidly in the bearings. By means of this lever-arm $z$ the drive-wheel is turned to guide the velocipede.

The operator of the driving cranks or treadles turns the series of toothed wheels and the drive-wheel, which, being of large diameter, and having, therefore, an extended bearing on the ground, gives motion to the velocipede.

When the velocipede is to be used on ice or snow, the drive-wheel is usually provided with peripheral pointed studs or short spikes, and instead of rear wheels, wheel-runners should be used on the axle ends.

Having described this invention, what I claim, and desire to secure by Letters Patent, is—

A velocipede having the rear extension, N, in combination with the forked arm $a$, provided with the rearward extension, $c$, the inner end of which extends above a horizontal plane and carries the gears $g$ and $m$, the latter having treadles, and the gear $d$, secured to the drive-wheel shaft $e$, the adjustable guide-rod $z$, spring-seat, and drive-wheels, substantially as specified.

In testimony whereof I affix my signature in presence of two witnesses.

ALVIN JAMES BRANHAM.

Witnesses:
G. F. YEAGER,
JAS. J. FIME.